United States Patent
Ali et al.

(10) Patent No.: US 8,937,104 B2
(45) Date of Patent: Jan. 20, 2015

(54) CROSS-LINKED POLYZWITTERION/ANION FOR THE REMOVAL OF STRONTIUM FROM AQUEOUS SOLUTIONS

(71) Applicant: King Fahd University of Petroleum and Minerals, Dhahran (SA)

(72) Inventors: Shaikh Asrof Ali, Dhahran (SA); Shamsuddeen Abdullahi Haladu, Dhahran (SA)

(73) Assignees: King Fahd University of Petroleum and Minerals, Dhahran (SA); King Abdulaziz City for Science and Technology, Riyadh (SA)

(*) Notice: Subject to any disclaimer, the term of this patent is extended or adjusted under 35 U.S.C. 154(b) by 129 days.

(21) Appl. No.: 13/873,080

(22) Filed: Apr. 29, 2013

(65) Prior Publication Data

US 2014/0323685 A1     Oct. 30, 2014

(51) Int. Cl.
*H01M 8/10* (2006.01)
*C08G 75/20* (2006.01)

(52) U.S. Cl.
CPC .................. *C08G 75/205* (2013.01)
USPC ............... 521/28; 521/31; 521/37; 521/38; 521/40; 521/42; 526/263

(58) Field of Classification Search
USPC ............. 521/31, 37, 38, 40, 42; 526/263
See application file for complete search history.

(56) References Cited

PUBLICATIONS

USPTO structure search, Oct. 2014.*
Al Hamouz, Othman Charles S. et al., "Removal of Heavy Metal Ions Using a Novel Cross-Linked Polyzwitterionic Phosphate", Separation and Purification Technology, 98, 94-101, 2012.
Ali, S.A. et al., "Synthesis and Solution Properties of a New Sulfobetaine/Sulfur Dioxide Copolymer and its Use in Aqueous Two-Phase Polymer Systems", Polymer, 44, 1671-1679, 2003.
Umar, Y. et al., "The Effects of Charge Densities on the Associative Properties of a PH-Responsive Hydrophobically Modified Sulfobetaine/Sulfur Dioxide Terpolymer", Polymer, 46, 10709-10717, 2005.

* cited by examiner

*Primary Examiner* — Gregory Listvoyb
(74) *Attorney, Agent, or Firm* — Richard C. Litman

(57) ABSTRACT

The cross-linked polyzwitterion/anion for the removal of strontium from aqueous solutions is a polyzwitterion having the following structure:

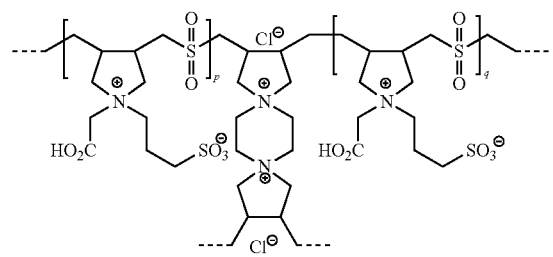

and the corresponding anion formed by treating the polyzwitterion with a base, e.g., sodium hydroxide. The cross-linked polyzwitterion/anion (CPZA) was prepared using Butler's cyclopolymerization protocol. The CPZA resin was found to have a very good adsorption capacity for $Sr^{2+}$ ions at low concentrations. The relatively strong rapid initial adsorption of 83% $Sr^{2+}$ ions was followed by slower adsorption of the remaining 17%, which was described by an intraparticle diffusion model. The adsorption followed the Lagergren second-order kinetic model, and Temkin as well as Freundlich isotherm models. The negative $\Delta G$s and $\Delta H$ ensured the spontaneity and the exothermic nature of the adsorption process. The excellent adsorption and desorption efficiencies implied the efficacy of the resin in removing (as well as recovering) the metal ions from aqueous solution.

2 Claims, 14 Drawing Sheets

Lagergren kinetic model parameters for $Sr^{2+}$ adsorption.

| | Pseudo second-order | | | | | |
|---|---|---|---|---|---|---|
| Temp (k) | $q_{e,exp}$ (mg g$^{-1}$) | $k_2$ (h$^{-1}$ g mg$^{-1}$) | $h^a$ (h$^{-1}$ g$^{-1}$ mg) | $q_{e,cal}$ (mg g$^{-1}$) | $R^2$ | $E_a$ (kJ mol$^{-1}$) |
| 296 | 0.365 | 72.2 | 9.80 | 0.369 | 0.9998 | |
| 308 | 0.358 | 82.3 | 10.3 | 0.354 | 0.9991 | 7.18 |
| 323 | 0.350 | 92.2 | 10.5 | 0.338 | 0.9995 | |

| | Pseudo first-order | | |
|---|---|---|---|
| Temp (k) | $q_{e,exp}$ (mg g$^{-1}$) | $k_1$ (h$^{-1}$) | $q_{e,cal}$ (mg g$^{-1}$) | $R^2$ |
| 296 | 0.365 | 0.651 | 0.0760 | 0.9934 |

$^a$Initial adsorption rate $h = k_2 q_e^2$.

Fig. 9

Freundlich and Temkin isotherm model constants for $Sr^{2+}$ adsorption.

| Freundlich isotherm model | | |
|---|---|---|
| $k_f$ ($mg^{1-1/n} g^{-1} L^{1/n}$) | $n$ | $R^2$ |
| 19.6 | 0.652 | 0.9930 |

| Temkin isotherm model | | |
|---|---|---|
| $A$ ($L\ g^{-1}$) | $B$ (J/mol) | $R^2$ |
| 46.5 | 0.268 | 0.9758 |

Fig. 10

Thermodynamic Data for $Sr^{2+}$ adsorption.

| Temperature (K) | $\Delta G$ (kJ/mol) | $\Delta H$ (kJ/mol) | $\Delta S$ (J/mol K) | $R^2$ |
|---|---|---|---|---|
| 296 | -4.03 | | | |
| 308 | -3.60 | -14.5 | -35.5 | 0.9910 |
| 323 | -3.07 | | | |

*Fig. 11*

CROSS-LINKED POLYZWITTERION/ANION FOR THE REMOVAL OF STRONTIUM FROM AQUEOUS SOLUTIONS

FIELD OF THE INVENTION

The present invention relates to wastewater treatment, and particularly to a cross-linked polyzwitterion/anion for the removal of strontium from aqueous solutions.

BACKGROUND OF THE INVENTION

Radioactive wastes containing a variety of radionuclides severely pollute the environment. Fission product like strontium $^{89}Sr$ and $^{90}Sr$ with half-lives of 51 days and 29 years, respectively, can contaminate underlying layers of soil and groundwater. Strontium's resemblance to calcium enables its easy incorporation into bone, and by virtue of being a very strong β-emitter, it leads to the development of bone sarcoma and leukemia. It is, thus, quite necessary to remove strontium, one of the most hazardous elements, from wastewater.

The literature describes many sorbent materials to remove larger concentrations of strontium ions. However, it remains challenging to develop new materials for removing strontium ions at ppb-levels. Thus, a cross-linked polyzwitterion/anion for the removal of strontium from aqueous solutions solving the aforementioned problems is desired.

SUMMARY OF THE INVENTION

The cross-linked polyzwitterion/anion for the removal of strontium from aqueous solutions is a polyzwitterion having the following structure:

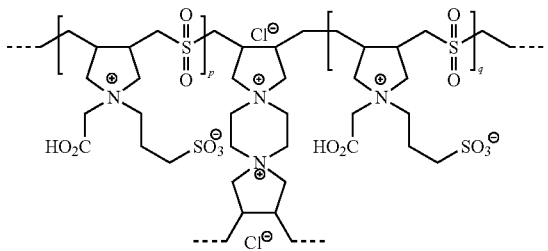

and the corresponding anion formed by treating the polyzwitterion with a base, e.g., sodium hydroxide. The cross-linked polyzwitterion/anion (CPZA) was prepared using Butler's cyclopolymerization protocol. The CPZA resin was found to have a very good adsorption capacity for $Sr^{2+}$ ions at low concentrations. The relatively strong rapid initial adsorption of 83% $Sr^{2+}$ ions was followed by slower adsorption of the remaining 17%, which was described by an intraparticle diffusion model. The adsorption followed the Lagergren second-order kinetic model, and Temkin as well as Freundlich isotherm models. The negative ΔGs and ΔH ensured the spontaneity and the exothermic nature of the adsorption process. The excellent adsorption and desorption efficiencies implied the efficacy of the resin in removing (as well as recovering) the metal ions from aqueous solution.

These and other features of the present invention will become readily apparent upon further review of the following specification and drawings.

BRIEF DESCRIPTION OF THE DRAWINGS

FIG. 9 is a table showing Lagergren kinetic model parameters for $Sr^{2+}$ adsorption by the CPZA for the removal of strontium from aqueous solutions according to the present invention.

FIG. 10 is a table showing Freundlich and Temkin isotherm model constants for $Sr^{2+}$ adsorption by the CPZA for the removal of strontium from aqueous solutions according to the present invention.

FIG. 11 is a table showing thermodynamic data for $Sr^{2+}$ adsorption by the CPZA for the removal of strontium from aqueous solutions according to the present invention.

Similar reference characters denote corresponding features consistently throughout the attached drawings.

DETAILED DESCRIPTION OF THE PREFERRED EMBODIMENTS

The cross-linked polyzwitterion/anion for the removal of strontium from aqueous solutions is a polyzwitterion having the following structure:

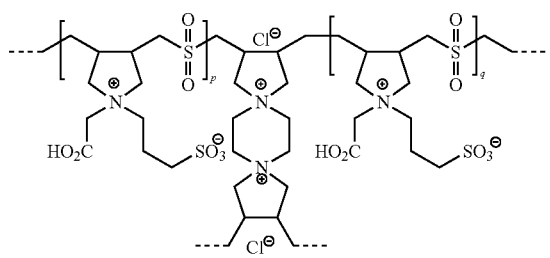

and the corresponding anion formed by treating the polyzwitterion with a base, e.g., sodium hydroxide, having the following structure:

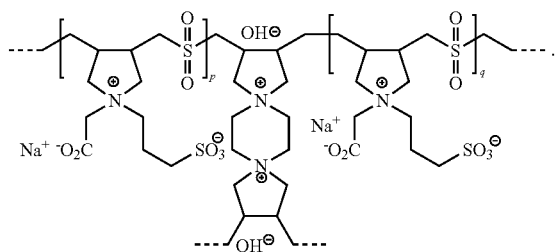

The cross-linked polyzwitterion/anion (CPZA) was prepared using Butler's cyclopolymerization protocol. The CPZA resin was found to have a very good adsorption capacity for $Sr^{2+}$ ions at low concentrations. The relatively strong rapid initial adsorption of 83% $Sr^{2+}$ ions was followed by slower adsorption of the remaining 17%, which was described by an intraparticle diffusion model. The adsorption followed the Lagergren second-order kinetic model, and Temkin as well as Freundlich isotherm models. The negative $\Delta$Gs and $\Delta$H ensured the spontaneity and the exothermic nature of the adsorption process. The excellent adsorption and desorption efficiencies implied the efficacy of the resin in removing (as well as recovering) the metal ions from aqueous solution.

Figure 1:
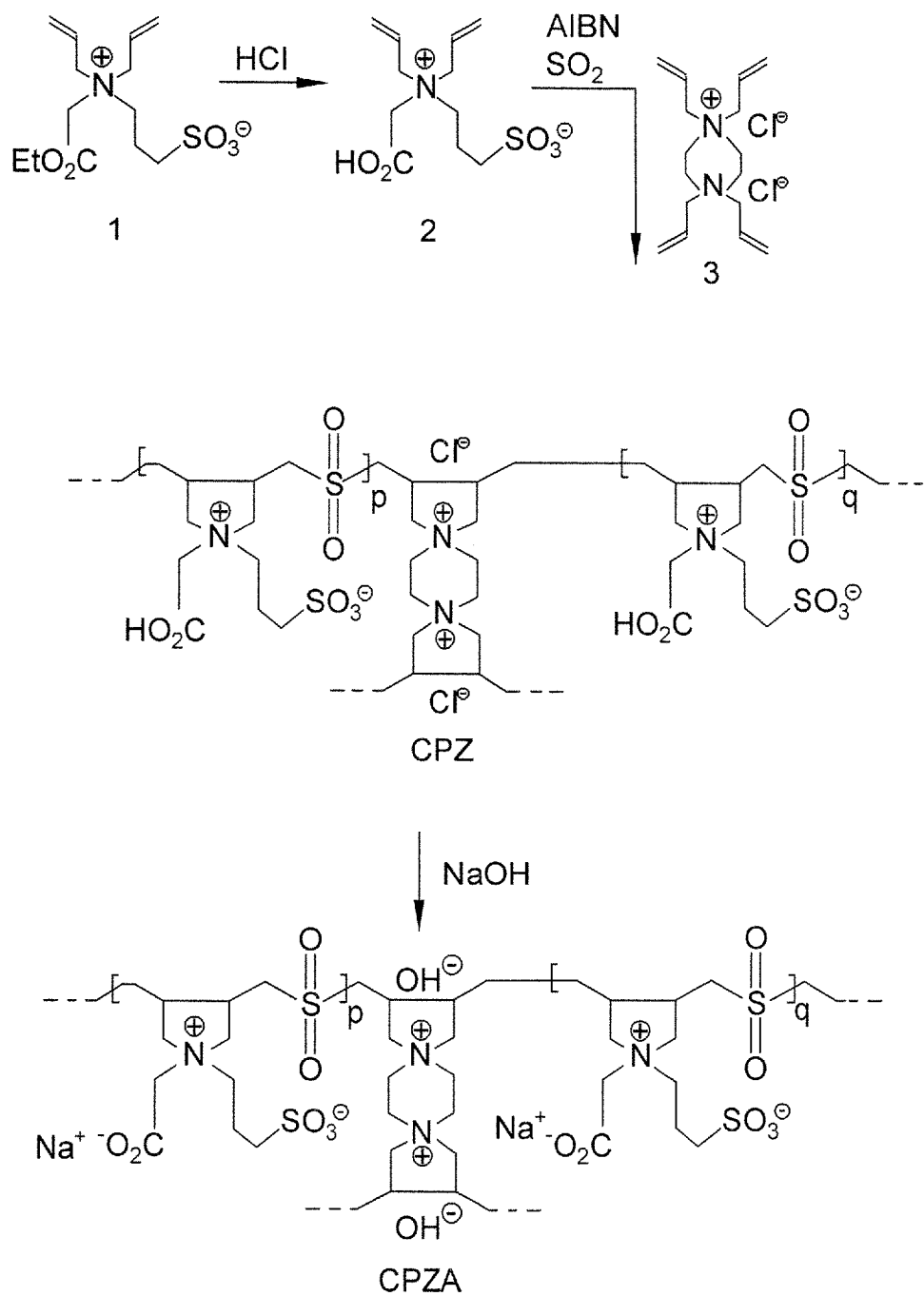
FIG. 1 is a reaction scheme for synthesizing a cross-linked polyzwitterion (CPZ) and its corresponding anion (CPZA) for the removal of strontium from aqueous solutions according to the present invention.

Butler's cyclopolymerization protocol has been utilized to synthesize the current CPZA resin 5 (FIG. 1).

Zwitterionic ester 1, which was prepared by reacting an equimolar mixture of N,N-diallyl-N-carboethoxymethylamine and 1,3-propanesultone in acetonitrile, and on acidic hydrolysis, afforded the zwitterionic acid 2 in excellent yield (95%), as shown in FIG. 1.

A mixture of monomer 2 (92.5 mol %), cross-linker 3 (7.5 mol %), and $SO_2$ (100 mol %) in DMSO solvent underwent cyclo-copolymerization in the presence of an initiator (AIBN) to give cross-linked polyzwitterion (CPZ 4) as a white solid. CPZ 4, upon treatment with excess NaOH, led to the formation of the present cross-linked polyzwitterion anion CPZA 5. To the best of our knowledge, this is the first cross-linked polymer via Butler's cyclopolymerization protocol that ensured the embedding of the zwitterionic as well as anionic motifs in each repeating unit. Elemental analysis of CPZ 4 confirmed the incorporation of monomer 2 and cross-linker 3 into CPZ 4 in an approximate molar ratio of 93:7, which is similar to the feed ratio.

Figure 3:
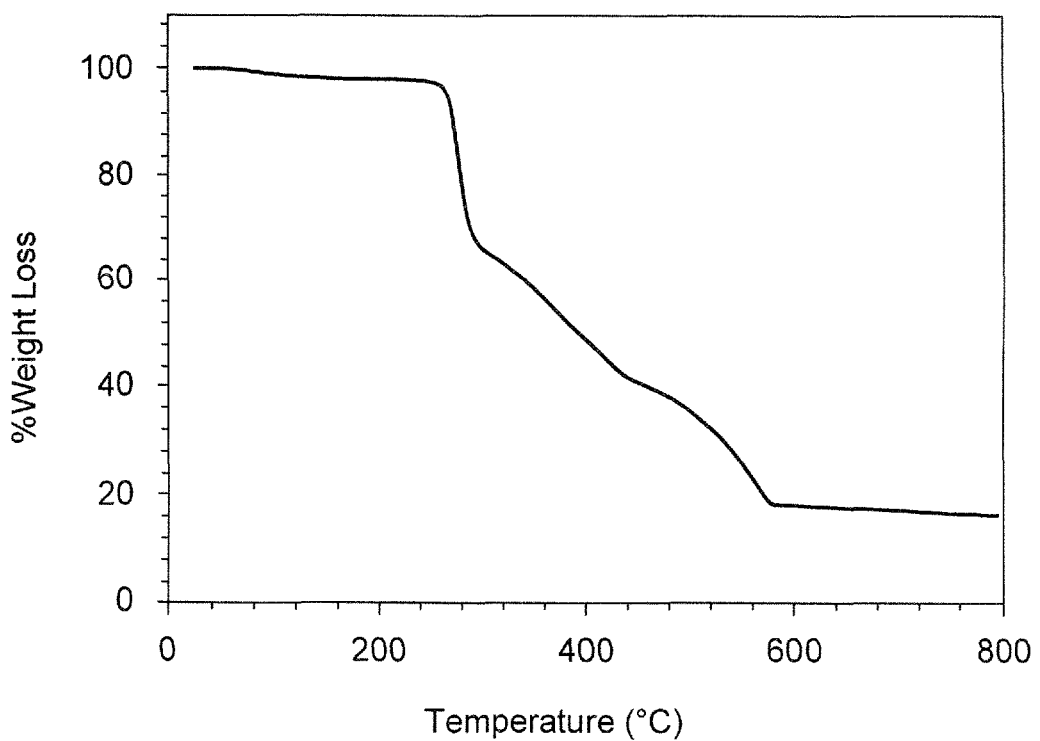
FIG. 3 is a plot showing the thermogravimetric analysis (TGA) curve of the CPZA for the removal of strontium from aqueous solutions according to the present invention.

The thermogravimetric analysis (TGA) curve of CPZA 5, shown in FIG. 3, showed two major losses in weight. First, a slow weight loss of 4.0% is attributed to the loss of water imbedded inside the cross-linked polymer. Second, a major loss of 28%, at around 250° C., is attributed to the loss $SO_2$. Third, a major loss of 52% is the result of combustion of the nitrogenated organic fraction, with the release of $CO_2$, $NO_x$ and $H_2O$ gases. The residual mass, at 800° C., was found to be 16%.

Figure 4:
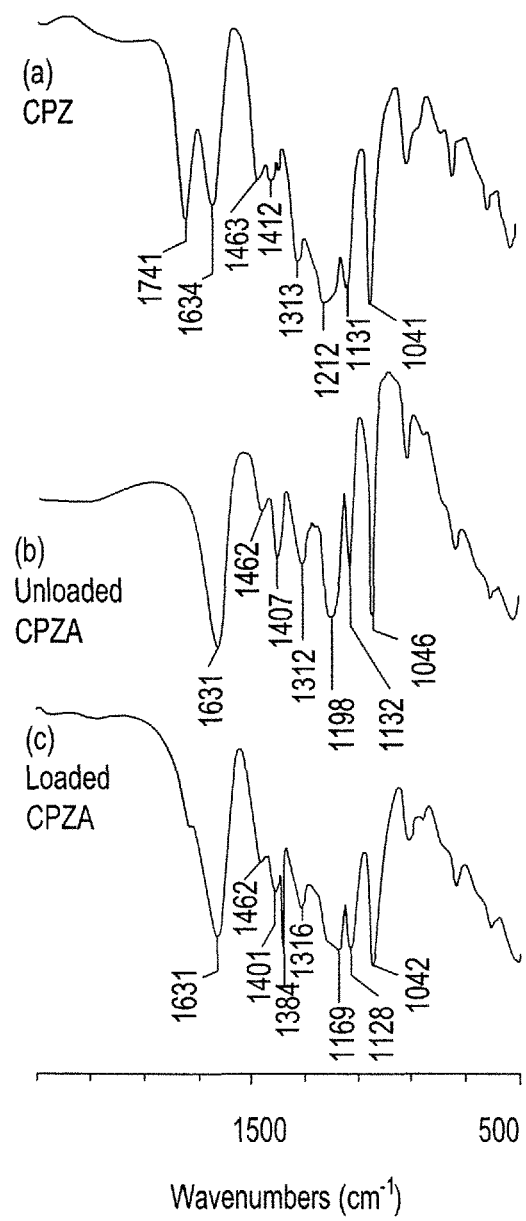
FIG. 4 is the IR spectra of a) CPZ; b) unloaded CPZA and c) CPZA loaded with $Sr^{2+}$ according to the present invention.

The IR spectrum of zwitterionic monomer 2 indicates the presence of sulfonate group by its strong characteristic bands at 1197 $cm^{-1}$ and 1040 $cm^{-}$, while the absorption at 1728 $cm^{-1}$ is attributed to C=O stretch of COOH. The corresponding absorptions for the CPZ 4 appear at 1212, 1041, and 1741 $cm^{-1}$, respectively (FIG. 4, spectrum a). The symmetric and antisymmetric stretching of $COO^-$ in the dipolar form of CPZ 4 were observed at 1412 and 1634 $cm^{-1}$, respectively. The two moderately strong bands at 1313 $cm^{-1}$ and 1131 $cm^{-1}$ were assigned to the asymmetric and symmetric vibrations of $SO_2$ unit.

For the unloaded resin CPZA 5, the absorption due to C=O stretch of COOH was missing. Instead, the symmetric and antisymmetric stretching of $COO^-$ appeared at 1407 and 1631 $cm^{-1}$ (FIG. 4, spectrum b). The appearance of a new band at 1384 $cm^{-1}$ for loaded CPZA (FIG. 4, spectrum c) was attributed to the presence of an ionic nitrate group, since the adsorption process was carried out in the presence of strontium nitrate. Interestingly, the presence of this band implies the ability of the CPZA resin to act also as an anion exchanger. Note that the absorption band attributed to the nitrate ion is absent in the IR spectrum of the unloaded CPZA resin 5 (FIG. 4, spectrum b). The IR spectra of the CPZA resin loaded with $Sr^{2+}$ (FIG. 4, spectrum c) revealed an increase in the intensity and broadness of the C=O vibrations as a result of the adsorption of the strontium ions.

Figure 2:
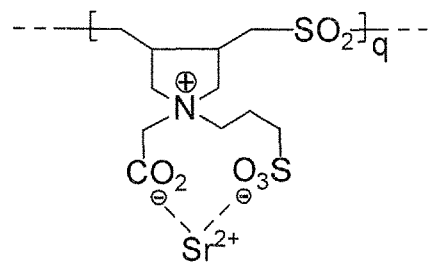
FIG. 2 is a diagram showing the hypothesized metal complex formed between carboxyl and sulfonate groups of the CPZ or the CPZA according to the present invention and $Sr^{2+}$ ions.
Figure 5A:
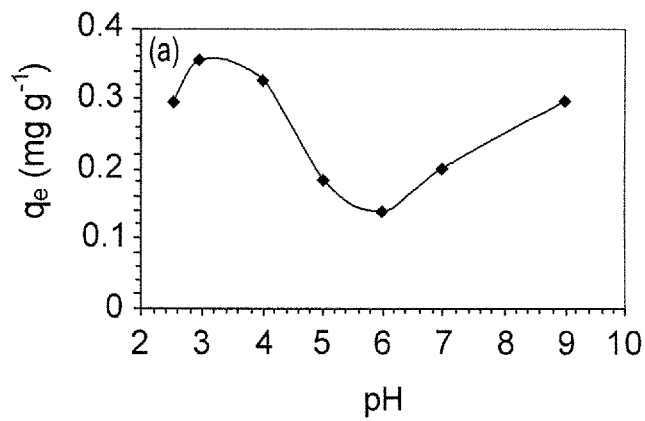
FIG. 5A is a plot showing the effect of pH on the adsorption capacity of the CPZA for the removal of strontium from aqueous solutions according to the present invention.

The effect of pH (in the range 2.5-9) on the uptake of $Sr^{2+}$ was investigated at a fixed concentration (1 mg $L^{-1}$) and time of 24 h at 23° C. Results of metal uptake at different pH are shown in FIG. 5A. Optimum pH was found to be 3. After reaching the minimum at pH 6, the adsorption capacity increases on further increasing the pH. $Sr^{2+}$ ions may be captured by carboxyl and sulfonate groups by chelation, as depicted in FIG. 2. It is worth mentioning that the $pK_a$ of $CO_2H$ and $SO_3H$ groups in this CPZA resin are expected to +2.5 and −2.1, respectively. At pH 3, or even at pH 2, a sizable proportion of $CO_2^-$ will exist in the acid-base equilibrium, and almost the entire $SO_3H$ will remain in the dissociated form of $SO_3^-$. Low adsorption of strontium at pH<3 can be attributed to competition of $H^+$ ions with $Sr^{2+}$ cations for the exchange sites in the adsorbent. At higher pH values, hydrolysis of the metal ions occurs by the formation of metal hydroxides, which compete with the metal ion uptake by the resin. The rest of the adsorption studies were carried out at the optimal pH of 3.

Figure 5B:
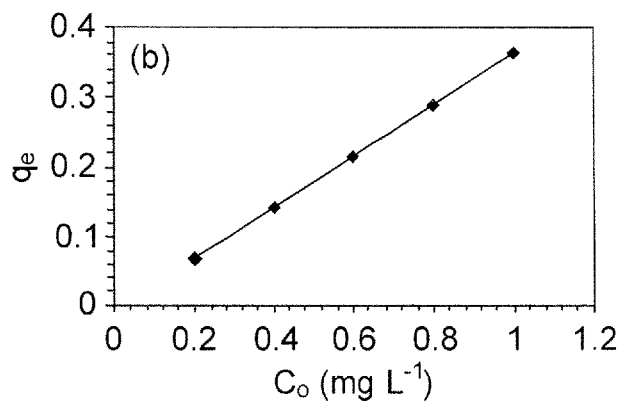
FIG. 5B is a plot showing the effect of initial concentration on the adsorption capacity of the CPZA or the removal of strontium from aqueous solutions according to the present invention.
Figure 5C:
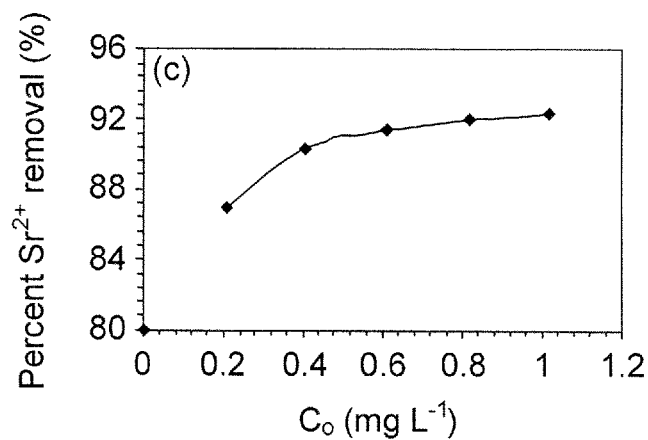
FIG. 5C is a plot showing the percent removal of $Sr^{2+}$ at various initial concentrations of the CPZA for the removal of strontium from aqueous solutions according to the present invention.

As shown in FIG. 5B, the adsorption capacity of CPZA 5 increased with increasing concentrations of $Sr^{2+}$ ions. The percent removal for the initial concentrations of 200 ppb and 1000 ppb (i.e. 1 ppm) was determined to be 87% and 92%, respectively (FIG. 5C). The absorption capacity ($q_{Sr^{2+}}$) in mg $g^{-1}$ can be calculated using equation (1):

$$q_{Sr^{2+}} = \frac{(C_0 - C_f)V}{W} \qquad (1)$$

where $C_0$ and $C_f$ are the initial and final concentrations of $Sr^{2+}$ ions in mg $L^{-1}$, respectively, W is the weight of the polymer in g, and V is the volume of the solution in L. Data presented are the average of three runs, and varied by less than 4% in all the cases studied.

Figure 5D:
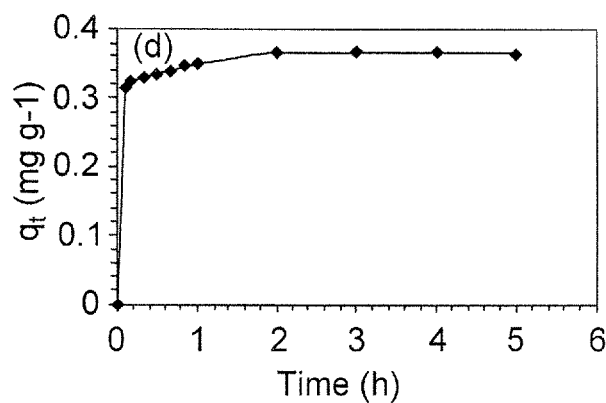
FIG. 5D is a plot showing the adsorption kinetic curve for the CPZA for the removal of strontium from aqueous solutions according to the present invention.

The adsorption kinetics, which describes the relationship between adsorption capacity and adsorption time, is presented in FIG. 5D. The adsorption process was found to be fast, and it reached the equilibrium within 2 h, indicating the strong ability of this CPZA resin to remove $Sr^{2+}$ ions from aqueous solutions.

Figure 6A:
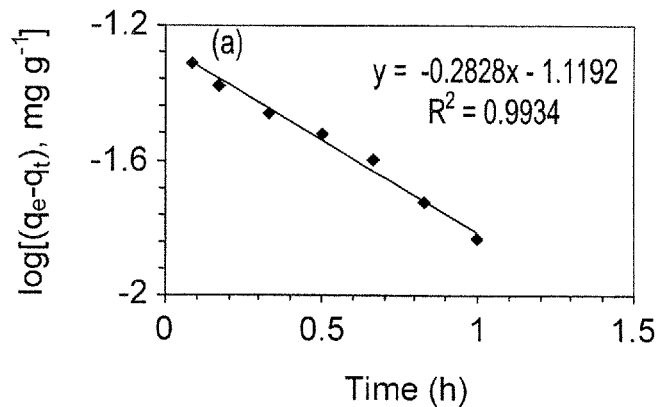
FIG. 6A is a plot showing a Lagergren first-order kinetic curve for adsorption of $Sr^{2+}$ by the CPZA for the removal of strontium from aqueous solutions according to the present invention.

Lagergren first-order kinetics describes the adsorption process in a solid-liquid system based on the adsorption capacity of the solid, where it assumes that one metal ion is adsorbed onto one adsorption site on the surface of the adsorbent. The linear form of the model can be described in the following equation (Eq. 2):

$$\log(q_e - q_t) = \log q_e - \frac{k_1 t}{2.303} \quad (2)$$

where $q_e$ and $q_t$ (mg $g^{-1}$) are the adsorption capacities at equilibrium and at time t (h), respectively, and $k_1$ is the first-order rate constant. The $k_1$ and $q_e$ were evaluated experimentally using the slope and intercept of the plots of $\log(q_e - q_t)$ versus t (FIG. 6A and the table in FIG. 9). The fitness of the data was found to be excellent, having a square of the regression coefficient ($R^2$) of 0.9934. Only the low time zone linear fit, not the longer time fit, was considered. However, agreement between experimentally observed equilibrium adsorption ($q_{e,\,exp}$=0.365 mg $g^{-1}$) and that derived using the first-order equation is very poor ($q_{e,\,cal}$=0.0760 mg $g^{-1}$), thereby indicating that the adsorption process does not fit with the Lagergren first-order kinetic model (see the table in FIG. 9).

The linear Lagergren second-order kinetic model can be expressed by the following equation (3):

$$\frac{t}{q_t} = \frac{1}{k_2 q_e^2} + \frac{t}{q_e} \quad (3)$$

where $k_2$ is second-order rate constant, and $q_t$ and $q_e$ are the respective adsorption capacities of the metal ions at a time t and at equilibrium e.

Figure 6B:
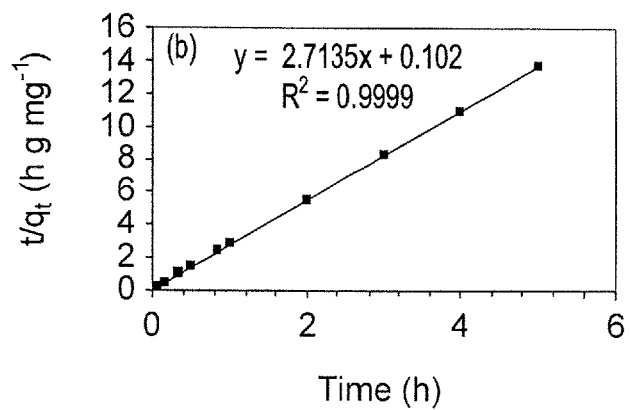
FIG. 6B is a plot showing a Lagergren second-order kinetic curve for adsorption of $Sr^{2+}$ by the CPZA for the removal of strontium from aqueous solutions according to the present invention.

It is evident from FIG. 6B and the table in FIG. 9 that the second-order Lagergren kinetic model fitted well with the adsorption of $Sr^{2+}$, indicating that the adsorption process might be a chemical adsorption. Also, the equilibrium adsorption capacities ($q_{e,\,cal}$: 0.369 mg $g^{-1}$) derived from Eq. (3) are in close agreement with those observed experimentally ($q_{e,\,exp}$: 0.365 mg $g^{-1}$) at 23° C. The experimental data so far revealed that the CPZA resin is an efficient adsorbent for the removal of strontium ions from aqueous solutions.

Figure 6C:
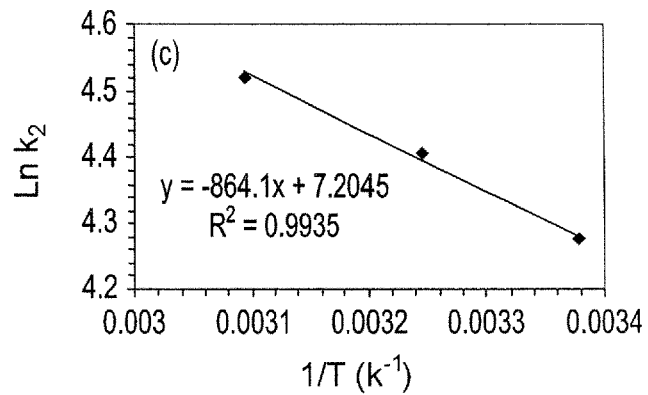
FIG. 6C is a plot showing the determination of the activation energy for $Sr^{2+}$ adsorption of the CPZA for the removal of strontium from aqueous solutions according to the present invention.

The adsorption activation energy can be deduced from the rate constants ($k_2$) obtained from the Lagergren second-order kinetic model (see FIG. 9) using the Arrhenius equation (Eq. 4) expressed as:

$$\ln k_2 = -\frac{E_a}{2.303 RT} + \text{constant} \quad (4)$$

where $k_2$ is the second order rate constant (g $mg^{-1}$ h), $E_a$ the activation energy (kJ $mol^{-1}$), R is the universal gas constant (8.314 J $mol^{-1}$ K), and T is the solution temperature (K). A plot of $\ln k_2$ versus 1/T gives a linear plot, with slope $-E_a/R$ (see FIG. 6C and the table in FIG. 9). The low activation energy value of 7.18 kJ $mol^{-1}$ is an indication of the favorability of the adsorption process.

Figure 6D:
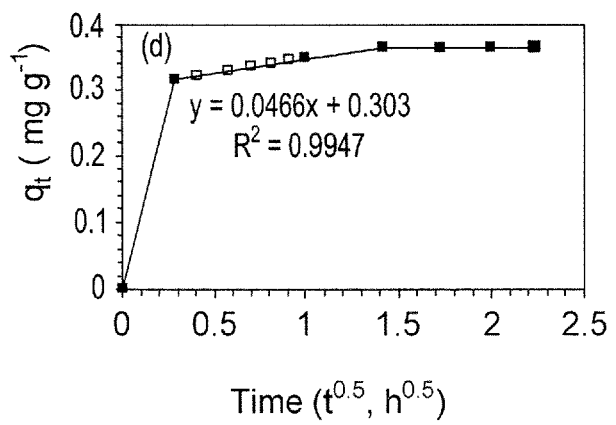
FIG. 6D is a plot showing intraparticle diffusion plot for $Sr^{2+}$ adsorption of the CPZA for the removal of strontium from aqueous solutions according to the present invention.

The mechanism of adsorption can be understood by determining the rate-limiting step, and this can be determined by using some adsorption diffusion models, which are always constructed on the basis of three consecutive steps, namely, (1) film diffusion (i.e., diffusion across the liquid film surrounding the adsorbent particles); (2) intraparticle diffusion (i.e., diffusion in the liquid contained in the pores and/or along the pore walls); and (3) mass action (i.e., fast physical adsorption and desorption between the adsorbate and active sites). The intraparticle diffusion model assumes that the metal ions are transported from the solution through an interface between the solution and the adsorbent (i.e., film diffusion), followed by a rate-limiting intraparticle diffusion step, which brings them into the pores of the particles in the adsorbent. The following equation expresses the relation of the adsorption capacity and time:

$$q_t = x_i + k_p t^{0.5} \quad (5)$$

where $q_t$ is the adsorption capacity at time t, $k_p$ is the rate constant of intraparticle diffusion, and $x_i$ is related to boundary layer thickness. According to the Weber-Morris model, a straight line fit for the plot of $q_t$ versus $t^{0.5}$ passing through the origin implies the intraparticle diffusion as the rate-limiting step. Since the initial linear plot did not pass through the origin, there is an intercept, which indicates that rapid adsorption occurs within a short period of time (see FIG. 6D).

The intercept $x_i$ of the linearized line was used to define the initial adsorption factor ($R_i$) as:

$$R_i = 1 - \frac{x_i}{q_e} \quad (6)$$

where $x_i$ is the initial adsorption amount and $q_e$ is the final adsorption amount at the longer time. The $x_i$ and $q_e$ values of 0.303 and 0.365 mg $g^{-1}$, respectively, gave an $R_i$ value of 0.17, which means that the relatively strong rapid initial adsorption has already reached 83% before the first adsorption data was collected at a time of 5 min. The other 17% of adsorption is governed by intraparticle diffusion, as indicated by the linear relation with an excellent square of correlation coefficient ($R^2$) of 0.9947 (see FIG. 6D). In this case, the intraparticle diffusion within the pores of the CPZA resin was the rate-limiting step. Note that the last linear section represents the final equilibrium stage.

As shown in FIG. 5B, the adsorption capacity of CPZA 5 increases with the increase in the initial concentration of $Sr^{2+}$ ions. To further explore the adsorption mechanism, Langmuir, Freundlich and Temkin isotherm models were used to analyze the adsorption data. The Langmuir isotherm model, which assumes the mechanism of the adsorption process as a monolayer adsorption on completely homogeneous surfaces where interactions between adsorbed molecules are negligible, can be expressed by Eq. (7):

$$\frac{C_e}{q_e} = \frac{C_e}{Q_m} + \frac{1}{Q_m b} \quad (7)$$

where $C_e$ and $q_e$ are the concentrations of metal ion in the solution and resin, respectively, and $Q_m$ and b are the Langmuir constants. The Langmuir plot of $C_e/q_e$ versus $C_e$ enables the calculation of Langmuir constants from the intercept and slope of the linear plot. The adsorption of $Sr^{2+}$ by the CPZA resin did not fit the Langmuir isotherm model, so the relevant graph has not been displayed.

Figure 7A:
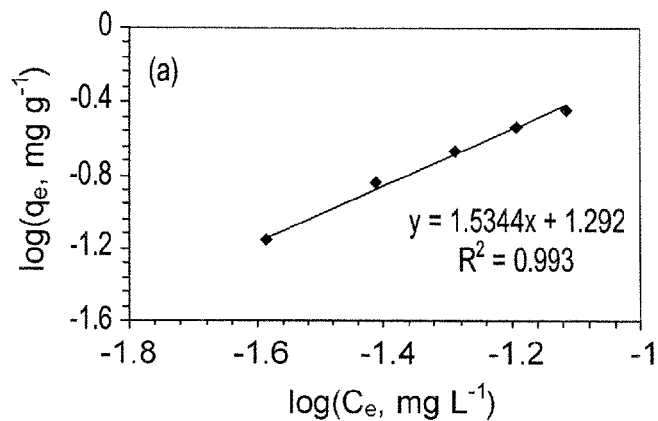
FIG. 7A is a Freundlich isotherm plot for $Sr^{2+}$ adsorption of the CPZA for the removal of strontium from aqueous solutions according to the present invention.

The Freundlich isotherm model, which describes the non-ideal adsorption occurring on a heterogeneous surface with uniform energy as well as multilayer adsorption, are expressed by the following equations (8) and (9):

$$q_e = k_f C_e^{1/n} \tag{8}$$

$$\log q_e = \log k_f + \frac{1}{n} \log C_e \tag{9}$$

where $k_f$ and n represent the Freundlich constants, which can be calculated from the slope and intercept of the linear plot of log $q_e$ versus log $C_e$, as presented in FIG. 7A. The value of n was determined to be 0.652. A 1/n value above unity implies cooperative adsorption.

The Temkin isotherm equation assumes that the heat of adsorption of all the molecules in a layer decreases linearly with coverage due to adsorbent-adsorbate interactions, and that the adsorption is characterized by a uniform distribution of the bonding energies up to some maximum binding energy. The Temkin isotherm has been used in the following form:

$$q_e = \frac{RT}{b} \ln(aC_e) \tag{10}$$

Figure 7B:
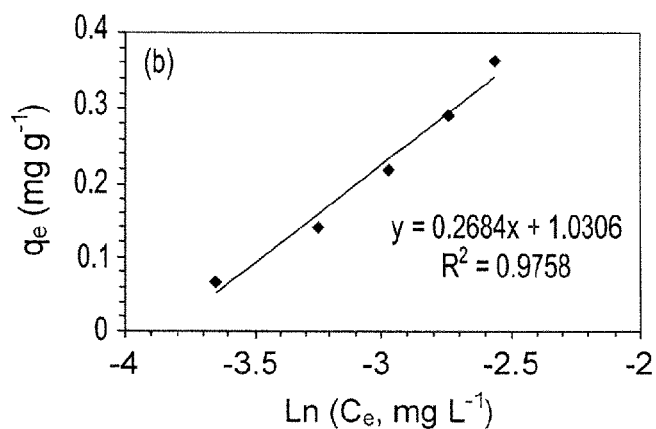
FIG. 7B is a Temkin isotherm plot for $Sr^{2+}$ adsorption of the CPZA for the removal of strontium from aqueous solutions according to the present invention.

A linear form of the Temkin isotherm can be expressed as:

$$q_e = \frac{RT}{b} \ln A + \frac{RT}{b} \ln C_e \tag{11}$$

$$q_e = B \ln A + B \ln C_e \tag{12}$$

where R is the gas constant (8.314 J mol$^{-1}$ K$^{-1}$), T is temperature (K), A is the equilibrium binding constant (L/g) corresponding to the maximum binding energy, and constant B=RT/b is related to the heat of adsorption. A plot of $q_e$ versus ln $C_e$ (shown in FIG. 5B) is used to calculate the Temkin isotherm constants A and B. FIGS. 7A and 7B illustrate that the adsorption of Sr$^{2+}$ ions fitted well the Freundlich and Temkin isotherm models, thereby implying that the adsorption may occur as a heterogeneous surface adsorption. The Freundlich and Temkin isotherm model constants are given in the table of FIG. 10.

Figure 7C:
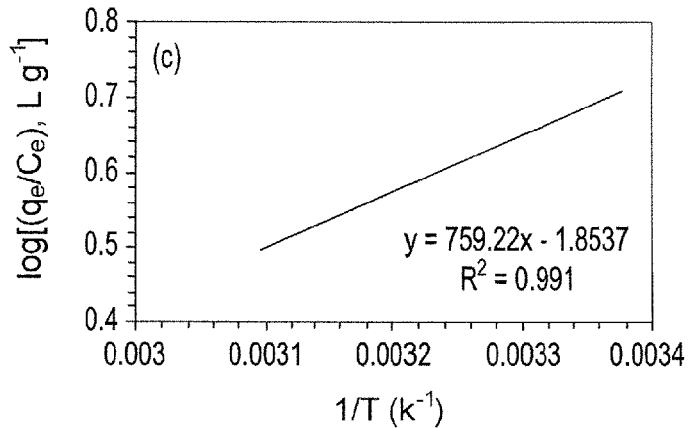
FIG. 7C is a plot showing $\log(q_e/C_e)$ versus $(1/T)$.

Adsorption experiments were also performed to obtain the thermodynamic parameters. The adsorption capacity decreases with the increase of temperature, thus suggesting the exothermic nature of the adsorption process and the weakening of bonds between Sr$^{2+}$ and active sites of adsorbents at high temperatures (see the table in FIG. 9). A plot of log($q_e$/$C_e$) versus 1/T is displayed in FIG. 7C. The thermodynamic parameters ΔG, ΔH and ΔS were calculated using the Van't-Hoff equation (Eq. 13), and are tabulated in the table of FIG. 11. The negative ΔG values ascertain the spontaneity of the adsorption process.

$$\log\left(\frac{q_e}{C_e}\right) = -\frac{\Delta H}{2.303 RT} + \frac{\Delta S}{2.303 R} \tag{13}$$

As the temperature increases, the ΔG values become less negative, indicating that the adsorption process is less favorable at the higher temperatures. The negative ΔH of −14.5 kJ mol$^{-1}$ indicates the exothermic nature of the adsorption process; similar exothermic behavior (ΔH=−5.9 and −5.2 kJ mol$^{-1}$) has been noted in two different reports describing the adsorption of strontium on polyacrylonitrile/zeolite composite adsorbent and Dowex 50W-X Resins. The negative value of ΔS (−35.5 J mol$^{-1}$ K$^{-1}$) is quite unexpected. However, it suggests the decrease in randomness at the solid/solution interface during the adsorption process as a result of replacement of Na$^+$ with Sr$^{2+}$.

Unloaded CPZ 4 and CPZA 5, as well as loaded resin 5, were investigated by scanning electron microscopy (SEM). Unloaded CPZA resins (60 mg) were immersed in Sr(NO$_3$)$_2$ solution (500 ppm in Sr$^{2+}$, 20 mL) for 24 h at a pH of 3, filtered, and dried under vacuum until constant weight was achieved. Loaded and unloaded CPZA polymers were then sputter-coated for 2 min with a thin film of gold.

Figure 8A:
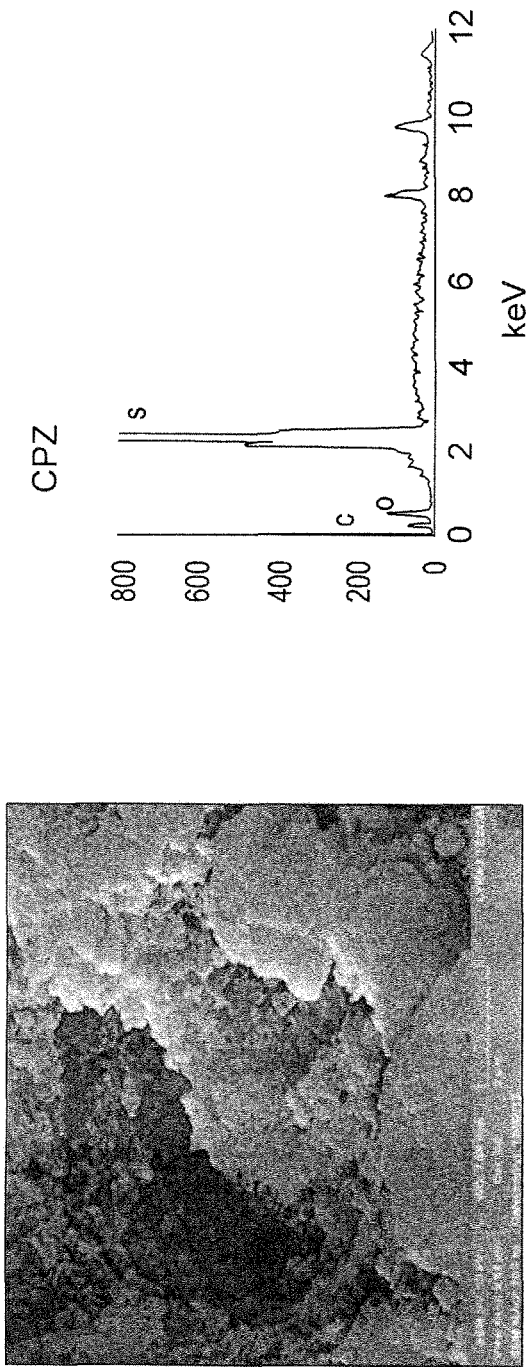
FIG. 8A shows SEM and EDX images for unloaded CPZ for the removal of strontium from aqueous solutions according to the present invention.
Figure 8B:
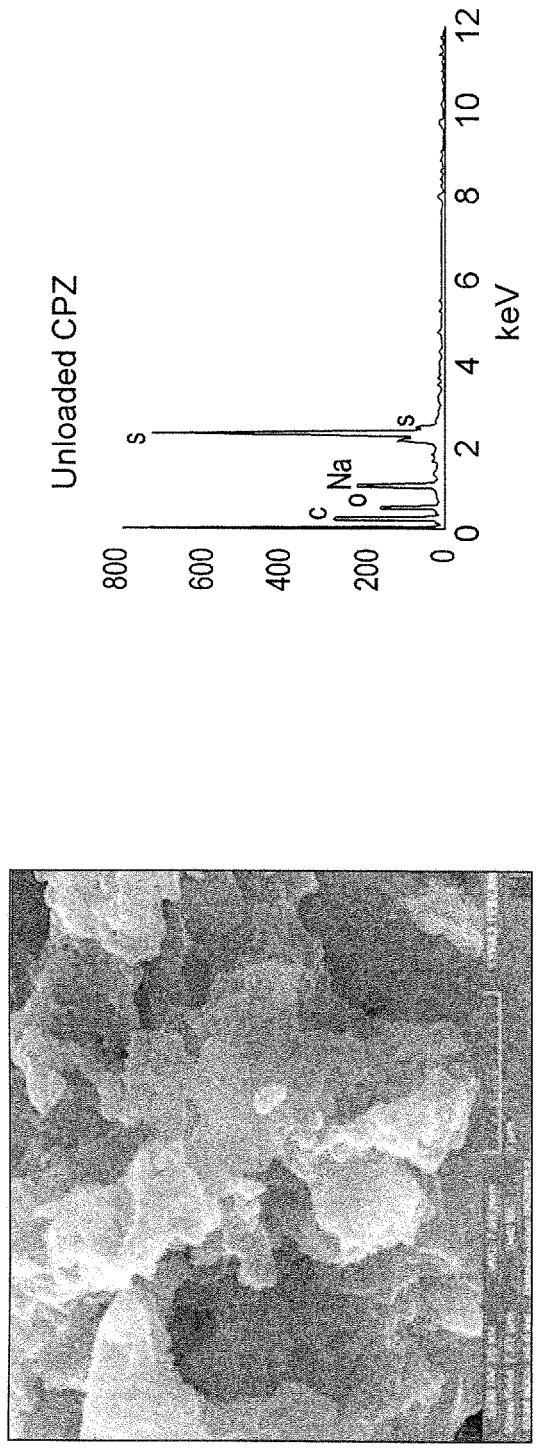
FIG. 8B shows SEM and EDX images for the unloaded CPZA for the removal of strontium from aqueous solutions according to the present invention.
Figure 8C:
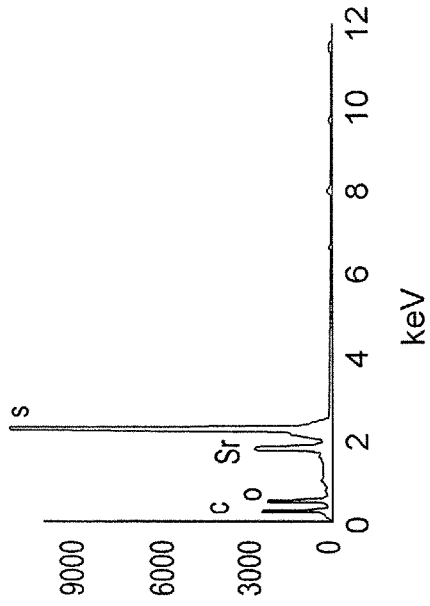
FIG. 8C shows SEM and EDX images for the CPZA for the removal of strontium from aqueous solutions according to the present invention loaded with $Sr^{2+}$.
Figure 8C:
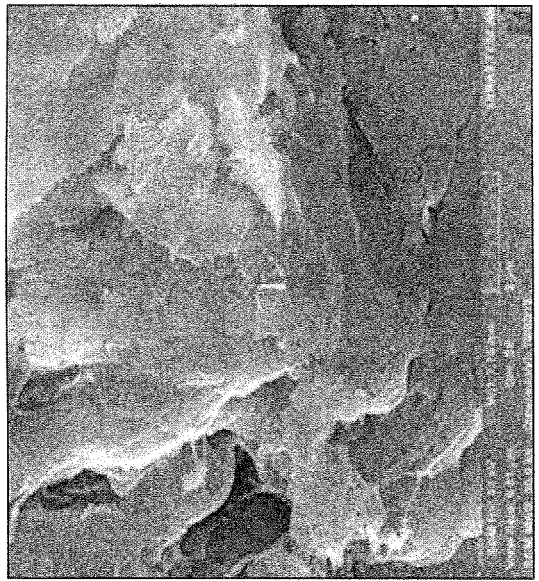

SEM and EDX images (FIGS. 8A-8C) show that the morphology has been altered by the adsorption of strontium ions (cracked morphology to smooth). The EDX analysis (FIGS. 8A and 8B) shows that the composition of unloaded CPZ 4 and unloaded CPZA 5 was similar to that proposed in FIG. 1. While the former has more tight surface morphology as a result of H-bonding involving COOH, the latter confirms the presence of Na$^+$ with an open morphology as a result of repulsion between the negative charges of the CO$_2^-$. FIG. 8C shows that the strontium ions have displaced the sodium ions in CPZA 5, thus confirming the adsorption of the metal ions. The SEM and EDX confirmed that CPZA 5 could be used as an efficient adsorbent of Sr$^{2+}$ in aqueous solutions at low concentrations.

In the following examples, elemental analysis was carried out on a Perkin Elmer Elemental Analyzer Series II Model 2400. IR spectra were recorded on a Perkin Elmer 16F PC FTIR spectrometer. $^1$H and $^{13}$C spectra were measured on a JEOL LA 500 MHz spectrometer using HOD signal at δ4.65 and dioxane signal at 67.4 ppm as internal standards, respectively. Atomic absorption spectroscopy (AAS) analysis was performed using AAS model iCE 3000 series (Thermo Scientific). Scanning electron microscopy (SEM) images were taken by TESCAN LYRA 3 (Czech Republic) equipped with Oxford, Energy-Dispersive X-ray spectroscopy (EDX) detector model X-Max. Thermogravimetric analysis (TGA) was performed using a thermal analyzer (STA 429) manufactured by Netzsch (Germany). The polymer sample to be tested (usually ~5 mg) was placed in a platinum crucible. Aluminum oxide (Al$_2$O$_3$; ~4 mg) was placed in an identical platinum crucible as a reference sample. With the sample carrier system, which had two sets of 10% Pt—Pt/Rh thermocouples, the sample carrier was placed in the middle of the vertical furnace, which was programmed and controlled by a microprocessor temperature controller. The temperature was raised at a uniform rate of 10° C./min. The analyses were made over a temperature range of 20-800° C. in an air atmosphere flowing at a rate of 100 mL/min.

Azoisobutyronitrile (AIBN) from Fluka AG was purified by crystallization from a chloroform-ethanol mixture. Diallylamine from Fluka Chemie AG (Buchs, Switzerland) was used as received. Dimethylsulfoxide (DMSO) was dried over calcium hydride overnight and then distilled under reduced pressure at a boiling point of 64-65° C. (4 mmHg). All solvents used were of analytical grade. Considering the high toxicity of radioactive ions, aqueous solutions of non-radioactive Sr$^{2+}$ ions were used in sorption experiments. For this purpose, Sr(NO$_3$)$_2$ was purchased from Fisher Scientific Company (New Jersey, USA).

EXAMPLE 1

Synthesis of Zwitterionic Ester (1)

The zwitterionic monomer N-carboethoxymethyl-3-(N,N-diallylamino) propanesulfonate (1) was prepared in 82% yield by reacting an equimolar mixture of N,N-diallyl-N-carboethoxymethylamine and 1,3-propanesultone in acetonitrile (130 cm³ for 0.13 mol amine) at 72° C. for 72 h, mp (methanol/acetone/diethyl ether) 162-163° C.

EXAMPLE 2

Acid Hydrolysis of Zwitterionic Ester 1 to Zwitterionic Acid 2

A solution of zwitterionic ester 1 (16.4 g, 53.7 mmol) in 6 M HCl (60 mL) was heated in a closed vessel at 80° C. for 27 h. The resulting solution was then freeze-dried to obtain 2 as a thick liquid, which was crystallized from a mixture of MeOH/CH₃CN/diethylether as white crystals (14.2 g, 95%). (Found: C, 47.4; H, 7.0; N, 4.9; S, 11.3%. $C_{11}H_{19}NO_5S$ requires C, 47.64; H, 6.91; N, 5.05; S, 11.56%); $v_{max}$ (KBr) 3500-2600 (br), 3015, 2980, 2930, 1728, 1642, 1479, 1400, 1324, 1197, 1166, 1081, 1040, 999, 972, 957, 941, 888, 801, 732, 698, 619, 596, 573, and 521 cm⁻¹; $\delta_H$ (D₂O) 2.07 (2H, quint, J 7.05 Hz), 2.77 (2H, t, J 6.7 Hz), 3.47 (2H, apparent t, J 7.95 Hz), 3.98-4.02 (6H, m), 5.56 (4H, m), 5.84 (2H, m), (HOD: 4.65); δC (D₂O) 18.36, 47.86, 56.82, 58.32, 62.68 (2C), 124.25 (2C), 130.42 (2C), 167.61 (dioxane: 67.40 ppm).

EXAMPLE 3

1,1,4,4-tetraallylpiperazinium dichloride (3)

Monomer 3, a cross-linker, was prepared as described in Ali et al., J. Appl. Polym. Sci., 61 (1996), 1077-1085, the contents of which are hereby incorporated by reference in their entirety.

EXAMPLE 4

Terpolymerization of Monomers 2, 3 and Sulfur Dioxide to Form Cross-Linked Polyzwitterion (CPZ) 4

Sulfur dioxide (1.28 g, 20 mmol) was absorbed in a mixture of 2 (5.55 g, 20 mmol) and cross-linker 3 (1.62 mmol, 0.52 g) in DMSO (7.0 g). Initiator AIBN (140 mg) was then added, and the mixture stirred at 65° C. for 24 h. At the end of the elapsed time, the hardened solid mass was soaked in water for 24 h with frequent changing of water, and finally dried under vacuum at 55° C. to a constant weight (5.00 g, 68%). (Found: C, 39.2; H, 5.9; N, 4.2; S, 17.7%. monomer 2/SO₂ $C_{11}H_{19}NO_7S_2$ (92.5 mol %) and monomer 3/SO₂ $C_{16}H_{28}Cl_2N_2O_2S$ (7.5 mol %) requires C, 39.56; H, 5.74; N, 4.34; S, 18.00%).

EXAMPLE 5

Basification of CPZ 4 to Form Cross-Linked Polyzwitterion/Anion (CPZA) 5

A mixture of CPZ 4 (4.6 g, 13.4 mmol) and sodium hydroxide (0.74 g, 18.5 mmol) in water (150 ml) was stirred for 24 h, after which it was poured into excess methanol. The resin CPZA 5 was filtered and dried under vacuum at 55° C. to a constant weight (4.7 g, 97%). TGA analysis showed initial decomposition around 250° C. (Found: C, 37.5; H, 5.4; N, 4.1; S, 16.7%. monomer 2/SO₂ $C_{11}H_{18}NNaO_7S_2$ (92.5 mol %) and monomer 3 (dihydroxide)/SO₂ $C_{16}H_{30}N_2O_4S$ (7.5 mol %) requires C, 37.79; H, 5.27; N, 4.17; S, 17.02%).

EXAMPLE 6

Adsorption Experiments

The procedure for the adsorption experiments of the cross-linked polymer CPZA 5 for $Sr^{2+}$ ions can be described briefly as follows. A mixture of CPZA (50 mg) in an aqueous $Sr(NO_3)_2$ (1 mg L⁻¹) solution (20 mL) was stirred using a magnetic stir-bar at different pH for 24 h. The filtrate was analyzed by atomic absorption spectroscopy to determine the amount of $Sr^{2+}$ that remained. The adsorption capacity ($q_{Sr^{2+}}$) in mg g⁻¹ can be calculated using Eq. 1. provided above.

For adsorption kinetic studies, the resin sample was stirred in a 1 mg L⁻¹ $Sr(NO_3)_2$ solution for different adsorption times at pH 3. The adsorption isotherm was constructed by changing the concentration of $Sr(NO_3)_2$ solution from 200 μg L⁻¹ (i.e. ppb) to 1000 μg L⁻¹ at 25° C. for 24 h. Based on the adsorption data from experiments carried out at different temperatures, the activation energy for the adsorption process and thermodynamic parameters ΔG, ΔH and ΔS for $Sr^{2+}$ removal were calculated.

EXAMPLE 7

Desorption Experiment

A desorption experiment was conducted by stirring 50 mg CPZA resin in aqueous $Sr(NO_3)_2$ (1 mg L⁻¹) solution (20 mL) for 24 h. The loaded CPZA resin was then filtered, dried, and immersed in 0.1 M HNO₃ for 24 h. After filtration, the amount of $Sr^{2+}$ ions desorbed in the filtrate was determined. The efficiency of the desorption process was calculated by the ratio of desorbed amount of $Sr^{2+}$ ions to the amount of adsorbed $Sr^{2+}$ ions in the CPZA resin. The results indicated the percentage efficiency of the desorption process to be 88%.

EXAMPLE 8

FT IR Spectroscopy

Unloaded and loaded resins were investigated by FTIR spectroscopy. Unloaded resins (30 mg) were immersed in 0.1 M $Sr(NO_3)_2$ solution (10 mL) for 4 h at a pH of 3, filtered, and dried under vacuum until constant weight was achieved.

The cross-linked polyzwitterion/anion (CPZA) resin was prepared using Butler's cyclopolymerization protocol. The CPZA provided an opportunity to test the efficacy of a zwitterionic/anionic motif for the first time in the removal of a model metal ion in low concentrations. The resin was found to have a very good adsorption capacity for $Sr^{2+}$ ions at low concentrations. The relatively strong rapid initial adsorption of 83% $Sr^{2+}$ ions was followed by slower adsorption of the remaining 17%, which was described by an intraparticle diffusion model. The adsorption followed a Lagergren second-order kinetic model, and Temkin as well as Freundlich isotherm models. The negative ΔGs and ΔH ensured the spontaneity and the exothermic nature of the adsorption process. The excellent adsorption and desorption efficiencies implied the efficacy of the resin in removing (as well as recovering) the metal ions from aqueous solution.

It is to be understood that the present invention is not limited to the embodiments described above, but encompasses any and all embodiments within the scope of the following claims.

We claim:
1. A cross-linked polyzwitterion anion for the removal of strontium from aqueous solutions, comprising a compound having the structure: where p and q are positive whole numbers
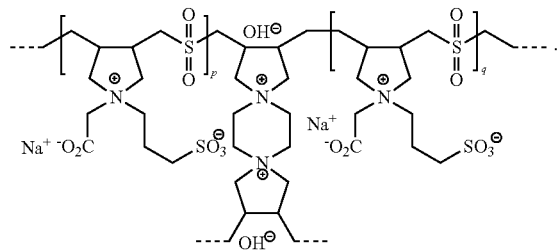
2. A cross-linked polyzwitterion for the removal of strontium from aqueous solutions, comprising a compound having the structure: where p and q are positive whole numbers.
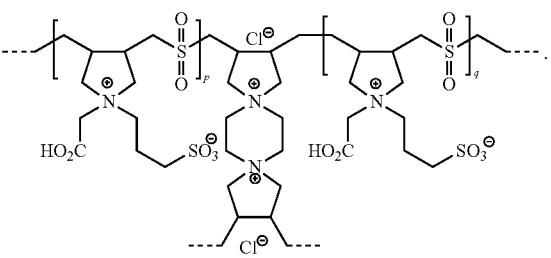
* * * * *